United States Patent [19]

Wong et al.

[11] Patent Number: 4,485,621

[45] Date of Patent: Dec. 4, 1984

[54] SYSTEM AND METHOD FOR REDUCING PARTICULATE EMISSIONS FROM INTERNAL COMBUSTION ENGINES

[75] Inventors: Victor W. Wong, Cambridge, Mass.; Zablon N. Mogaka, Columbus, Ind.

[73] Assignee: Cummins Engine Company, Inc., Columbus, Ind.

[21] Appl. No.: 456,485

[22] Filed: Jan. 7, 1983

[51] Int. Cl.³ .............................................. F01N 3/02
[52] U.S. Cl. ........................................ 60/274; 60/288; 60/297; 60/303; 60/311; 219/375
[58] Field of Search ................. 60/274, 297, 288, 311, 60/303; 219/375

[56] References Cited

U.S. PATENT DOCUMENTS

| | | | |
|---|---|---|---|
| 3,654,432 | 4/1972 | Dyre | 219/375 |
| 3,744,249 | 7/1973 | August | 60/288 |
| 4,404,796 | 9/1983 | Wade | 60/288 |

FOREIGN PATENT DOCUMENTS

| | | | |
|---|---|---|---|
| 2259946 | 6/1974 | Fed. Rep. of Germany | 60/288 |
| 2845928 | 5/1979 | Fed. Rep. of Germany | 60/288 |
| 2084898 | 4/1982 | United Kingdom | 60/303 |

*Primary Examiner*—Douglas Hart

*Attorney, Agent, or Firm*—Neuman, Williams, Anderson & Olson

[57] ABSTRACT

A method for removing particulates from internal combustion exhaust gases in a system which includes a first gas conduit which connects with an engine exhaust pipe and which communicates with a trapping chamber containing means for filtering or trapping particulate matter present in the exhaust gas. A second gas conduit connects with said first gas conduit at a location upstream of the said trapping chamber and leads to a regenerating chamber which contains an electrically conductive substrate which carries an oxidation catalyst. A third gas conduit carries the hot gas from the regenerating chamber and connects with said first gas conduit at a location also upstream of said trapping chamber. The electrically conductive substrate material within the regenerating chamber is part of an electrical circuit and is heated by current passing therethrough. Means are provided for injecting a combustible fuel into the regenerating chamber wherein the fuel-exhaust gas mixture is effectively heated and burned therein and the heated gas then passes into the trapping chamber to incinerate and burn off the particulate collected therein. Valve means are provided to selectively direct exhaust gas flow through to the trapping chamber and the regenerating chamber.

3 Claims, 3 Drawing Figures

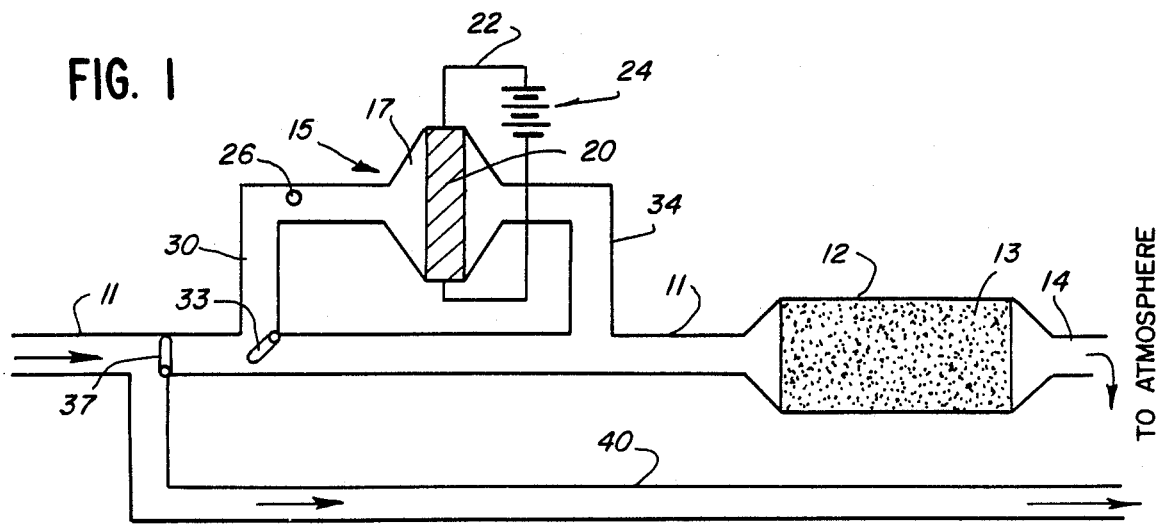
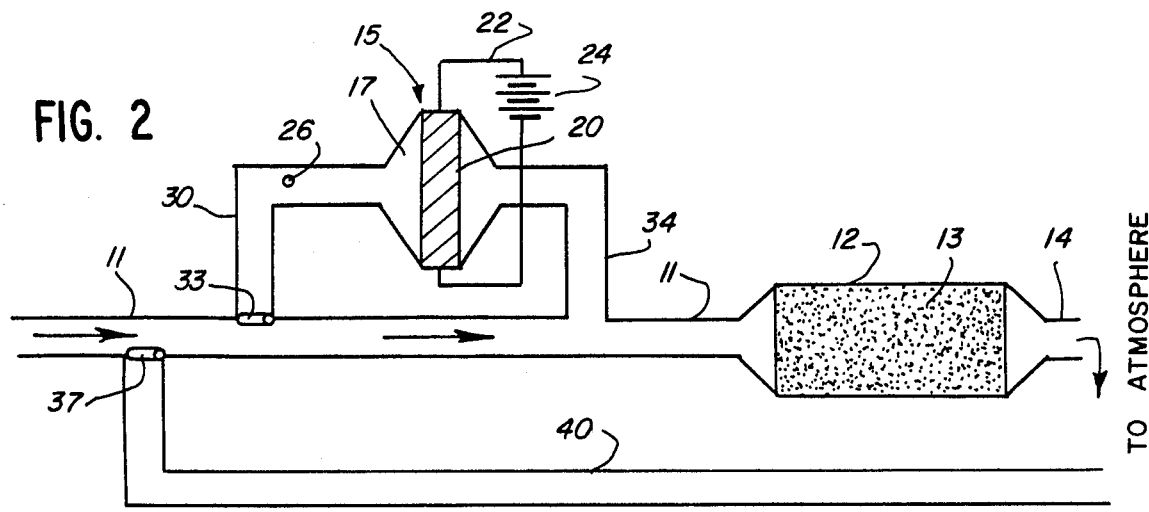
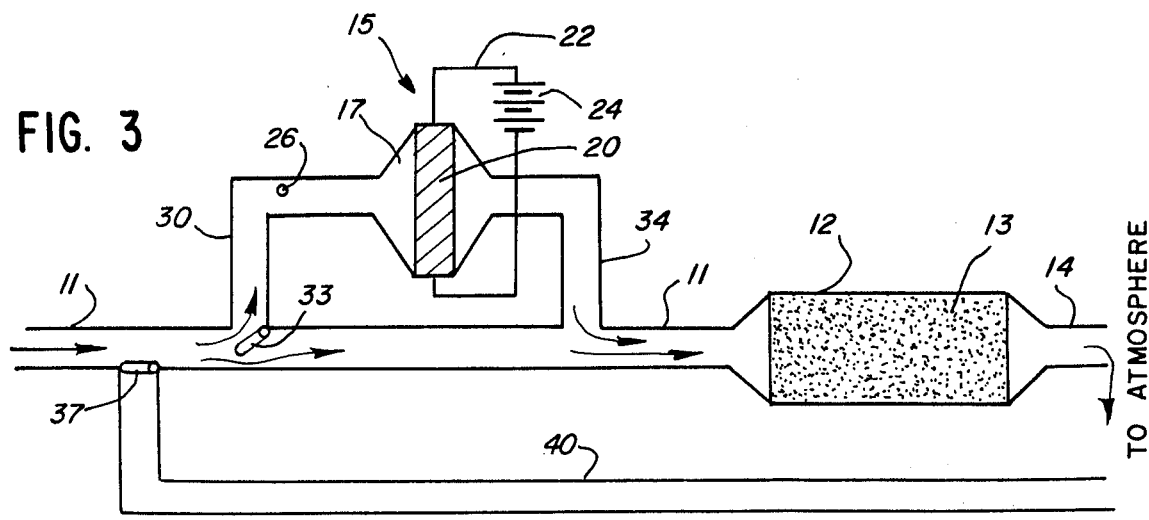

SYSTEM AND METHOD FOR REDUCING PARTICULATE EMISSIONS FROM INTERNAL COMBUSTION ENGINES

BACKGROUND OF THE INVENTION

This invention relates to a novel system and method for purifying the exhaust gases emitted from internal combustion engines and more particularly to a system and method for removing particulate emissions from said exhaust gases.

The exhaust gas from internal combustion engines contains finely divided particulate matter which consists largely of carbon particles. The reduction of particulate emissions from the exhaust of internal combustion engines is a matter of considerable importance at the present time. A number of devices or systems have been proposed for this purpose with varying degrees of success. A major desideratum of such devices is that they be capable of undergoing regeneration so as to maintain effectiveness over long periods. Regeneration techniques which reduce the efficiency of the particulate removing devices or which result in damage thereto, such as by the formation of excessive amounts of corrosive gases, are not satisfactory. Regeneration techniques which produce excessive amounts of harmful by-products, such as sulfates, are likewise not satisfactory.

OBJECTS OF THE INVENTION

It is a major object of this invention to provide a novel system for purifying internal combustion engine exhaust gases.

Another object of the invention is to provide a method for purifying internal combustion engine exhaust gases.

It is another object of this invention to remove particulates from engine exhaust gases utilizing a system which includes regeneration means.

It is a further object of the invention to provide a system for removing particulates from engine exhaust gases which functions effectively for extended periods of time.

A still further object of the invention is to provide a system for removing particulates from engine exhaust gases which minimizes excessive production of corrosive gases.

SUMMARY OF THE INVENTION

The present invention involves a method and system or device for removing particulates from internal combustion exhaust gases. The system includes a first gas conduit which connects with an engine exhaust pipe and which communicates with a trapping chamber containing means for filtering or trapping particulate matter present in the exhaust gas. A second gas conduit connects with said first gas conduit at a location upstream of the said trapping chamber and leads to a regenerating chamber which contains an electrically conductive substrate which carries an oxidation catalyst. A third gas conduit carries the hot gas from the regenerating chamber and connects with said first gas conduit at a location also upstream of said trapping chamber. The electrically conductive substrate material within the regenerating chamber is part of an electrical circuit and is heated by current passing therethrough. Means are provided for injecting a combustible fuel into the regenerating chamber wherein the fuel-exhaust gas mixture is effectively heated and burned therein and the heated gas then passes into the trapping chamber to incinerate and burn off the particulate collected therein. Valve means are provided to selectively direct exhaust gas flow through to the trapping chamber and the regenerating chamber. A by-pass conduit is provided to permit by-pass of the regenerating chamber and the trapping chamber when desired.

BRIEF DESCRIPTION OF THE DRAWINGS

The advantages of the invention will be more fully understood from the following description of the preferred embodiment read in conjunction with the accompanying drawings wherein:

FIG. 1 is a schematic view showing a preferred system according to the invention for purifying exhaust gases emitted from internal combustion engines.

FIG. 2 is a view similar to FIG. 1 showing the flow of exhaust gas through the system during operation thereof and when regeneration is not being effected.

FIG. 3 is a view similar to FIG. 1 showing the flow of exhaust gas through the system during operation thereof when regeneration is taking place.

DESCRIPTION OF ILLUSTRATED PREFERRED EMBODIMENTS

Referring to FIG. 1, gas conduit 11 connects with the exhaust pipe (not shown) of a diesel or gasoline combustion engine. Conduit 11 leads to trapping chamber or particulate trap 12 which contains a suitable material designated by the numeral 13 for filtering or trapping particulate materials such as carbon particles present in the engine exhaust gas. The filtering or trapping material 13 can be any of the filtering elements known in the art to be useful to collect exhaust gas particulates and which is capable of being subjected to relatively high temperatures sufficient to incinerate or burn off the carbon collected therein. Examples of suitable filtering materials include ceramic beads or monolithic ceramic structures, metal wire mesh screens and the like. An outlet passage 14 connected to trap 12 is provided to exhaust purified exhaust gas to the atmosphere.

Disposed in upstream relationship to particulate trap 12 is a catalytic regenerator designated generally by the numeral 15. This regenerator comprises a chamber 17 containing an electrically conductive substrate material designated by the numeral 20. The substrate 20 is formed of a material which conducts electric current and which is capable of withstanding high temperatures on the order of 600° C. and above, such as silicon carbide and the like. The electrically conductive substrate 20 forms part of an electric circuit by virtue of its connection with wire 22 which connects with an electrical power source 24. The substrate 20 carries an oxidation catalyst which acts to oxidize a combustible fuel which is injected through fuel injection nozzle 26 in gas conduit 30. Examples of suitable oxidation catalysts include metals which are not readily oxidized such as platinum, palladium and the like.

Gas conduit 30 communicates with gas conduit 11, with the gas flow therethrough being controlled by diverter valve 33. An outlet conduit 34 provides communication between gas conduit line 11 and the discharge side of catalytic regenerator 15.

The exhaust gas purifying system of the invention can be completely by-passed when desired by switching diverter valve 37 in by-pass line 40 to the position shown in FIG. 1 of the drawing. With diverter valve 37 set in this closed position, the exhaust gas flows by way of by-pass conduit 40 and is vented to the atmosphere without undergoing purification.

In operation of the system, when it is desired to purify exhaust gases by removing particulates therefrom, exhaust gas flow is as shown in FIG. 2. Thus, during the particulate removing cycle diverter valve 37 is positioned to close by-pass conduit 40 and diverter valve 33 is set in closed position to prevent flow through conduit 30 and regenerator 15. The diverter valves 33 and 37 can be switched by conventional manual or automatic control means (not shown). When the diverter valves 33 and 37 are set in the positions (closed) shown in FIG. 2, the entire exhaust gas stream flowing through gas conduit 11 passes through particulate trap 12 wherein particulates are removed and purified exhaust gas is vented to the atmosphere through discharge 14.

When the particulate trap 12 becomes filled with particulates to a predetermined extent so as to restrict passage of exhaust gas therethrough, regeneration thereof is conducted. During the regeneration cycle diverter valve 33 is switched to a partially open position as shown in FIG. 3. When diverter valve 33 is in the partially open position a portion of the exhaust gases flowing through gas conduit 11 is diverted through conduit 30 and subjected to oxidative combustion in regenerator 15. During the regeneration cycle a combustible fuel is injected through fuel nozzle 26 and is carried by the exhaust gas flowing through conduit 30 into regenerating chamber 17. Electric current passing through the substrate 20 heats that material by resistive heating to temperatures above about 250° C. This heating causes catalytic oxidative combustion of the injected fuel and exhaust gas mixture. The hot combustion gases then are discharged through conduit 34 and then pass through particulate trap 12 to incinerate particulates trapped therein. In this way, the particulate trap 12 is regenerated. After a suitable period of regeneration the particulate trap 12 is restored to full efficiency and the regeneration operation ceases. At this time diverter valve 33 is switched to a position to stop flow to the regenerator 15 and exhaust gas is caused to flow directly to particulate trap 12 as shown in FIG. 2 until the next regeneration cycle. The purified gases are discharged from trap 12 and vented to the atmosphere through line 14.

During the regeneration cycle the quantity of combustible fuel introduced through fuel injection nozzle 26 is adjusted to control the temperature of the combustion products leaving regenerator 15. This temperature is sufficiently high so that when the combustion products are mixed with the exhaust gas stream flowing through conduit 11 the temperature of the resultant mixture will be at or above that required for particulate incineration in trap 12, i.e., a temperature of above about 600° C. Because not all of the exhaust gas is passed through the regenerator during the regeneration cycle, excessive oxidation of sulfur dioxide to corrosive sulfates is avoided thus resulting in longer life for the exhaust gas purifying system. Also, by passing only a portion of the exhaust gas through the regenerator ignition of fuel on the catalyst is more easily achieved. This feature also reduces wide flow variations in the combustion zone and significantly reduces electrical power requirements for heating the substrate.

Automotive internal combustion engines often operate, such as in urban traffic, with greatly varying exhaust flow rates. As a result, combustion instability of burners in the exhaust purification system has been an obstacle to the development of reliable regeneration systems for particulate traps. With the present invention, catalytic oxidation of a fuel occurs in a substrate which does not exhibit the flame instability problems of a diffusion-burning fuel spray.

Those modifications and equivalents which fall within the spirit of the invention are to be considered a part thereof.

What is claimed is:

1. Apparatus for removal of particulates from exhaust gas emitted by an internal combustion engine which comprises a first gas flow conduit leading to the exhaust of an internal combustion engine and to a chamber containing means for removing particulates from exhaust gas, a second gas flow conduit connecting with said first gas flow conduit at a location upstream of said chamber containing means for removing particulates from exhaust gas, said second gas flow conduit connecting with a chamber containing an electrically conductive substrate material having an oxidation catalyst disposed therewith, a third gas flow conduit leading from said chamber containing the electrically conductive substrate material and connecting to said first gas flow conduit at a location upstream of said chamber containing means for removing particulates from exhaust gas, means for electrically heating said substrate material, means for introducing a combustible fuel into said chamber containing an electrically conductive substrate material and flow directing means for selectively directing flow through said first and second gas flow conduits.

2. Apparatus in accordance with claim 1 which also includes a by-pass conduit having associated valve means for directing exhaust gas flow through said by-pass conduit.

3. A method for removing particulate matter from the exhaust gas of an internal combustion engine which comprises flowing said exhaust gas into a trapping chamber containing means for removing particulates, periodically regenerating said trapping chamber by diverting a portion of the flow of exhaust gas to a regenerating chamber containing heating means and an oxidation catalyst, injecting a combustible fuel into said regenerating chamber, heating said combustible fuel and said portion of exhaust gas in said regenerating chamber and passing the combustion products from said regenerating chamber to said trapping chamber to incinerate trapped particles threin.

* * * * *